United States Patent
Matsuyama et al.

(10) Patent No.: US 8,675,222 B2
(45) Date of Patent: Mar. 18, 2014

(54) INFORMATION DISTRIBUTION SYSTEM, INFORMATION DISPLAY APPARATUS, INFORMATION MANAGEMENT METHOD, AND COMPUTER READABLE MEDIUM

(75) Inventors: Norikazu Matsuyama, Ishikawa (JP); Kyoji Inari, Ishikawa (JP); Shoichi Takemori, Ishikawa (JP); Yurika Takayama, Ishikawa (JP)

(73) Assignee: PFU Limited, Ishikawa (JP)

( * ) Notice: Subject to any disclaimer, the term of this patent is extended or adjusted under 35 U.S.C. 154(b) by 773 days.

(21) Appl. No.: 12/413,040

(22) Filed: Mar. 27, 2009

(65) Prior Publication Data
US 2009/0244644 A1 Oct. 1, 2009

(30) Foreign Application Priority Data
Mar. 30, 2008 (JP) .................. 2008-088960

(51) Int. Cl.
*G06F 13/00* (2006.01)

(52) U.S. Cl.
USPC ......... 358/1.15; 358/405; 358/407; 358/1.14; 726/2; 726/4; 726/6

(58) Field of Classification Search
USPC ......... 358/1.15, 405, 407; 709/201, 249, 202; 715/200, 204; 726/2, 3, 4, 6
See application file for complete search history.

(56) References Cited

U.S. PATENT DOCUMENTS

| | | | | |
|---|---|---|---|---|
| 7,042,500 | B1* | 5/2006 | Niikawa | 348/211.4 |
| 7,181,017 | B1* | 2/2007 | Nagel et al. | 380/282 |
| 2007/0043864 | A1* | 2/2007 | Nemoto | 709/225 |
| 2007/0271213 | A1 | 11/2007 | Ono et al. | |
| 2009/0135444 | A1* | 5/2009 | Best et al. | 358/1.15 |
| 2009/0250513 | A1* | 10/2009 | Shoemaker | 235/380 |

FOREIGN PATENT DOCUMENTS

| | | | |
|---|---|---|---|
| JP | 2005-071327 | 3/2005 | |
| JP | 2006-259942 | 9/2006 | |
| JP | 2007-172207 | 5/2007 | ............ G06K 17/00 |
| JP | 2007-172207 | 7/2007 | |
| JP | 2007-334864 | 12/2007 | |

OTHER PUBLICATIONS

Austin Shoemaker, U.S. Appl. No. 60/986,587 "Close-Contact Confirm then Communicate Data Exchange Methods and Apparatus", Nov. 8, 2007, (Provisional of PGPub 20090250513).*
Office Action from Japan Patent Office for JP 2008-088960, corresponding application in Japan.
JPO Office Action in JP 2008-088960 (corresponding application to present application) dated Feb. 10, 2012. Original in Japanese and English translation.

* cited by examiner

*Primary Examiner* — King Poon
*Assistant Examiner* — Jamares Q Washington
(74) *Attorney, Agent, or Firm* — Hogan Lovells US LLP

(57) ABSTRACT

An information distribution system that includes an information reading apparatus reading out data distributed from an information medium and an information display apparatus having an information acquisition unit for acquiring the data distributed from said information reading apparatus, a display for displaying the data acquired by said information acquisition unit, and a display limitation unit for imposing display limitations on the data acquired by said information acquisition unit according to the state of connection between said information reading apparatus and the information display apparatus.

11 Claims, 8 Drawing Sheets

(B) Information distribution system 1 in an indirectly-connected state (A) Information distribution system 1 in a directly-connected state (B) Information distribution system 1 in an indirectly-connected state

Fig. 3

| Content ID | Distribution source ID | Reference point in time | Time limit | Authentication information |
|---|---|---|---|---|
| AAAA | Scanner A | 08/03/23 13:15 | 30 days | Right x 3, left x 2,right x 1 |
| BBBB | Scanner A | 08/03/23 13:45 | 30 days | Not set |
| CCCC | Unknown | NULL | NULL | NULL |
| ... | ... | ... | ... | ... |

Content database 600

| Content ID | Distribution source ID | Reference point in time | Time limit | Reference position | Restricted area | Authentication information |
|---|---|---|---|---|---|---|
| AAAA | Scanner A | 08/03/23 13:15 | 30 days | 35.658587 139.745428 | In the same building | Right x 3, left x 2, right x1 |
| BBBB | Scanner A | 08/03/23 13:45 | 30 days | 35.658587 139.745428 | In the same administrative district | Not set |
| CCCC | Unkown | NULL | NULL | NULL | NULL | NULL |
| ... | ... | ... | ... | ... | ... | ... |

Content data base 602

Fig. 7

INFORMATION DISTRIBUTION SYSTEM, INFORMATION DISPLAY APPARATUS, INFORMATION MANAGEMENT METHOD, AND COMPUTER READABLE MEDIUM

CROSS-REFERENCE TO RELATED APPLICATIONS

This application is based on and claims priority under 35 USC 119 from Japanese Patent Application No. 2008-88960 filed Mar. 30, 2008, the entire disclosure of which is hereby incorporated by reference herein.

BACKGROUND OF THE INVENTION

Technical Field

The present invention relates to an information management method and apparatus.

SUMMARY OF THE INVENTION

According to an aspect of the invention, there is provided an information distribution system including an information reading apparatus and an information display apparatus. The information reading apparatus reads out data distributed from an information medium. The information display apparatus has information acquisition unit for acquiring the data distributed from said information reading apparatus, display for displaying the data acquired by the information acquisition unit, and display limitation unit for imposing display limitations on the data acquired by the information acquisition unit according to the state of connection between the information reading apparatus and the information display apparatus.

BRIEF DESCRIPTION OF THE DRAWINGS

Exemplary embodiments of the present invention will be described in detail based on the following figures, wherein:

FIG. 3 is a diagram showing a content database 600;

FIG. 7 is a diagram showing a content database 602 in the first modified example.

DETAILED DESCRIPTION

[System Configuration]

First, the entire configuration of the information distribution system 1 is described.

Figure 1A:
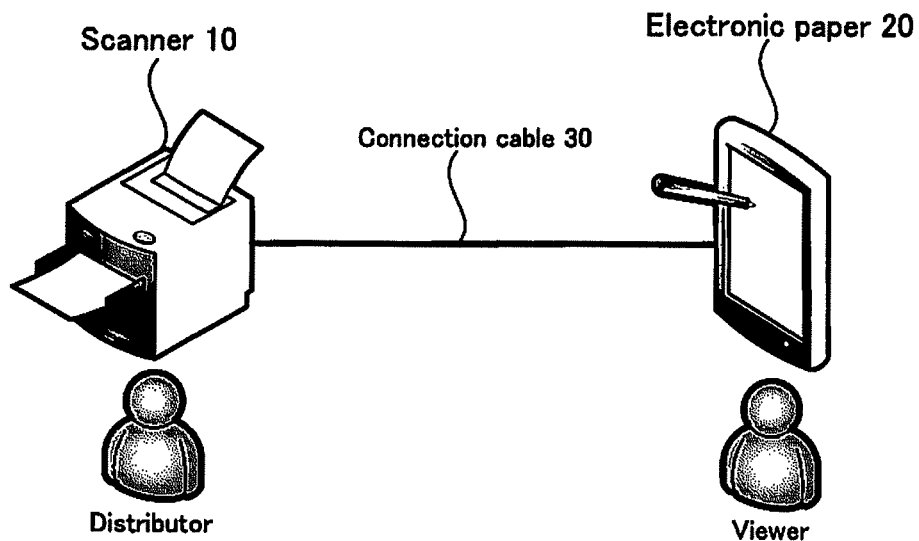
FIG. 1(A) is a schematic view showing an information distribution system 1 in a directly-connected state and FIG. 1(B) is a schematic view showing an information distribution system 1 in a indirectly-connected state.
Figure 1B:
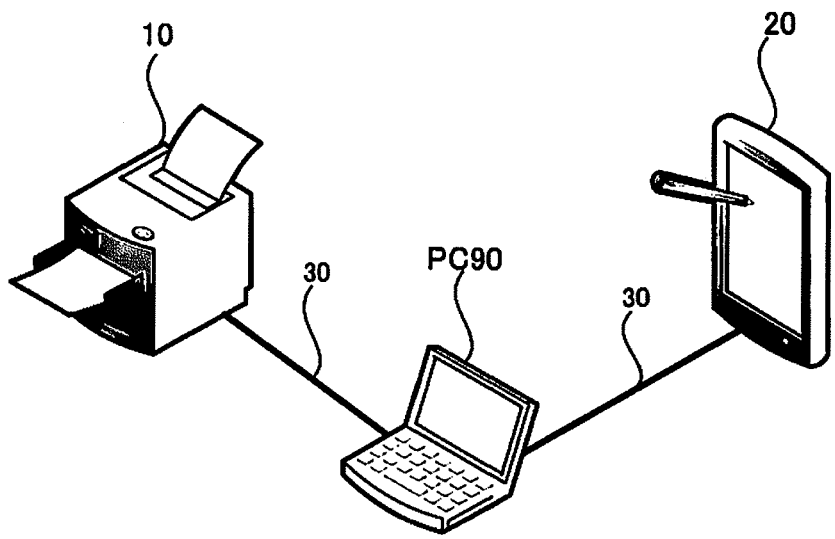

FIG. 1(A) exemplifies the information distribution system 1 in a directly-connected state. FIG. 1(B) exemplifies the information distribution system 1 in a indirectly-connected state.

As shown in FIG. 1, the information distribution system 1 includes a scanner 10 and electronic paper 20.

The scanner 10 is an example of an information reading apparatus, which optically reads out data (images) from manuscript copies (information media, image display media).

The electronic paper 20 is an example of an information display apparatus, which displays data read by the scanner 10. The information display apparatus may be any device capable of receiving and displaying data; however, it is preferable that in such a device restrictions are imposed on taking out data once received.

As shown in FIG. 1(A), the electronic paper 20 of this embodiment can be connected directly with the scanner 10 using a connection cable 30 such as a USB (Universal Serial Bus) cable or a LAN (Local Area Network) cable. In this manner, a state wherein the electronic paper 20 and the scanner 10 are connected without an intermediary device is referred to as "a directly-connected state". The following description illustrates an embodiment wherein a USB cable is used as the connection cable 30 and the host function for the USB connection is provided on the scanner 10 as a specific example.

On the other hand, as shown in FIG. 1(B), the electronic paper 20 can be connected indirectly with the scanner 10 through an intermediary device such as a personal computer 90 (PC 90). In this manner, a state wherein the electronic paper 20 and the scanner 10 are connected through an intermediary device is referred to as an "indirectly-connected state". In the indirectly-connected state of this embodiment, the PC 90 functions as a host computer.

In the indirectly-connected state of FIG. 1(B), data (image data) read by the scanner 10 is transferred via the PC 90 to the electronic paper 20. Under this condition, there is a possibility that the data remains in a memory area of the PC 90. Accordingly, there is a tendency that an indirectly-connected state has a higher risk of information leaks than a directly-connected state. On the other hand, a directly-connected state with a cable, which is similar to the circumstances where an information distributor hands over manuscript copies directly to a viewer, is also expected to encourage the viewer to carefully handle the distributed information. At the same time, the distributor can visually check the information management status. Furthermore, since the electronic paper 20 specialized for information display function does not have an information redistribution function and has a low possibility of infection by computer viruses, it can be expected in a configuration where data is directly received from the scanner 10 that the risk of information leaks is significantly reduced by appropriately imposing limitations only on the display of information.

Conversely, data distributed in a directly-connected state can be deemed more highly confidential by the distributor than data distributed in an indirectly-connected state.

Furthermore, at the time of viewing information, there is also a difference in the risk of information leaks, such as that due to an unauthorized view of the electronic paper 20, between the state where the electronic paper 20 is directly connected with the scanner 10 and the state where the electronic paper 20 is not connected with the scanner 10 (non-connected state). This is because information in a directly-connected state is more likely under the control of a distributor.

In this manner, the risk of information leaks differs depending on the state of connection between the scanner 10 and the electronic paper 20; therefore, the information distribution system 1 of the present embodiment changes the limitation conditions for displaying (viewing) information according to the state of connection between the scanner 10 and the electronic paper 20.

Figure 2:
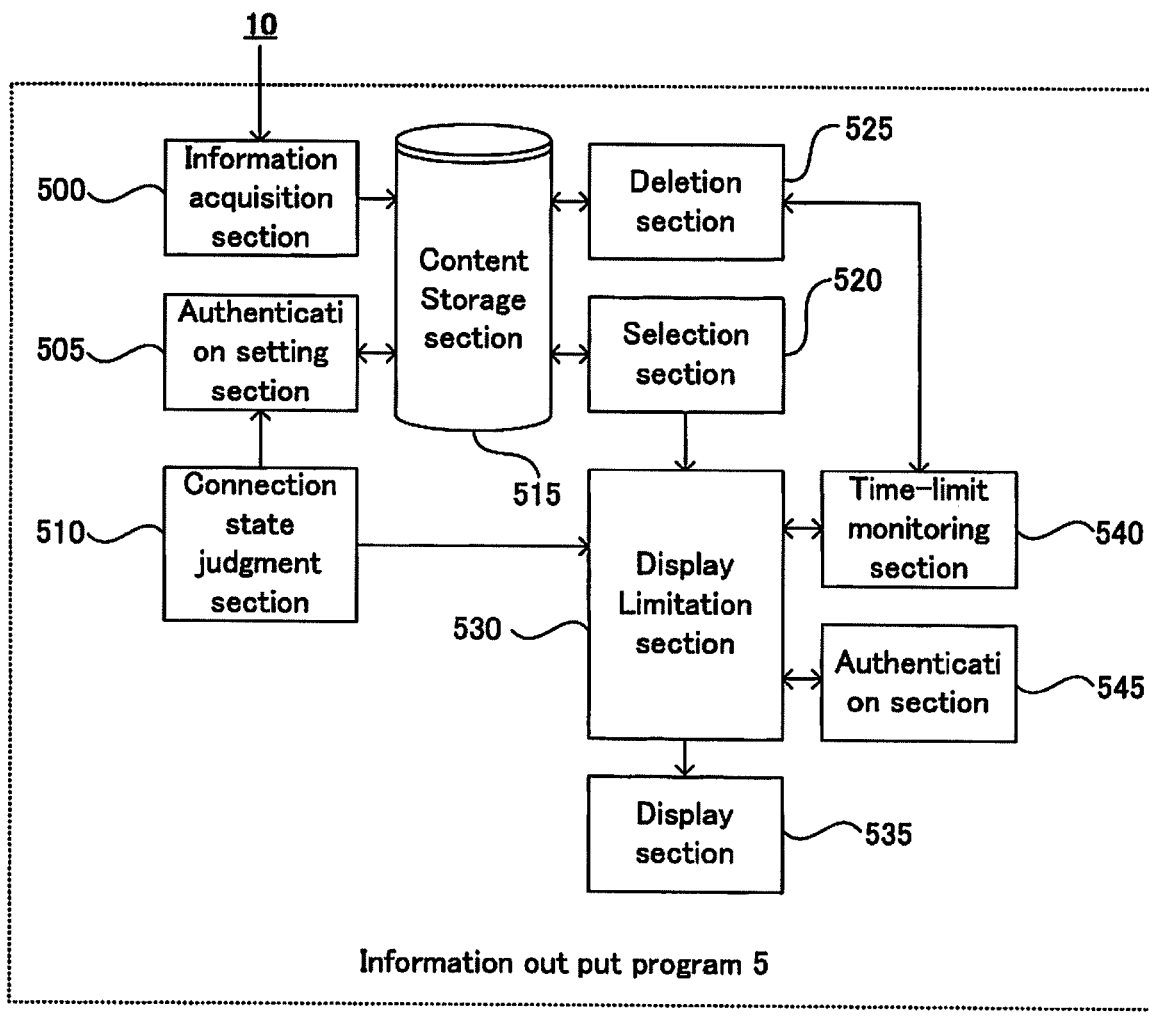
FIG. 2 is a block diagram showing a functional configuration of an information output program 5 to be installed in an electronic paper 20 (FIG. 1)

FIG. 2 is a block diagram exemplifying a functional configuration of the information output program 5 that is installed in the electronic paper 20 (FIG. 1).

As shown in FIG. 2, the information output program 5 has an information acquisition section 500, an authentication setting section 505, a connection state judgment section 510, a content storage section 515, a selection section 520, a deletion section 525, a display limitation section 530, a display section 535, a time-limit monitoring section 540, and an authentication section 545.

Functional configurations of the information output program 5 are stored in storage medium such as a CD-ROM and are installed from this storage medium into the electronic paper 20 (FIG. 1). Alternatively, the functional configurations of the information output program 5 may be installed into the electronic paper 20 via a network.

Furthermore, all or part of the functions of the information output program 5 may be implemented by hardware such as an ASIC provided in the electronic paper 20.

In the information output program 5, the information acquisition section 500 obtains data (image data) read by the scanner 10. The information acquisition section 500 of this embodiment obtains image data through the connection cable 30 in a directly-connected state with the scanner 10.

The authentication setting section 505 serves to set up the authentication information regarding the image data (content) obtained by the information acquisition section 505. For example, the authentication setting section 505 issues a password, accepts the password from the user, registers the biological information of the user to carry out biometric authentication, or registers the signature of the user for handwriting authentication, for each piece of image data obtained.

The authentication setting section 505 of this embodiment accepts page turning operations by a user as a password, assigns the accepted password to the content, and outputs the password to the content storage section 515. More specifically, when a user carries out any combination of multiple page turning operations (forward page turning operations (hereinafter referred to as right-operations) and backward page turning operations (hereinafter referred to as left-operations)) using a user interface provided on the electronic paper 20, the authentication setting section 505 accepts a sequential combination of these page turning operations (for example, three right-operations, two left-operations, one time of right-operation, in due order) as a password for the content.

The connection state judgment section 510 serves to judge the state of connection between the scanner 10 and the electronic paper 20. The concept of a state of connection includes the presence/absence of connection between the scanner 10 and the electronic paper 20, connection media, and connection methods; for example, there are a state of non-connection (non-connected state), a state of wired connection which uses only cables for the connection, a state of wireless connection which uses radio transmission for the connection, as well as the directly- and indirectly-connected states described by referring to FIG. 1.

The connection state judgment section 510 of this embodiment receives identification information of the apparatus connected directly through the connection cable 30 (apparatus ID), and determines whether the state of connection is a directly-connected state with the scanner 10 (FIG. 1(A)) or a state of other connection through the PC 90 (FIG. 1(B)) based on the received apparatus ID.

The content storage section 515 stores the content entered from outside (the content received from the scanner 10, and the content received from other devices). As shown in FIG. 3, the content storage section 515 of this embodiment stores the content (content ID) distributed from outside, when corresponding identification information of the distribution source (apparatus ID of the distribution source), reference point in time of the content (for example, date and time when the content is read by the scanner 10, date and time when the content is received, or date and time when described in the content), time limit set up for the content, and authentication information set up by the authentication setting section 505 are associated.

The selection section 520 selects the content to be displayed, and reads out from the content storage section 515, according to the operation by the user (viewer).

The deletion section 525 deletes the content that has passed the time limit from among the content stored in the content storage section 515. The concept of deleting the content includes: setting a deletion flag to exclude the item from the search targets, and deleting the link information to the content, in addition to the elimination of the content data from the memory area. It is more favorable to completely erase the content data from the memory area for security reasons.

The display limitation section 530 imposes severer display limitations in cases where the state of connection between the scanner 10 and the electronic paper 20 is other than the directly-connected state (indirectly-connected state or non-connected state) than in cases where the directly-connected state is employed between the scanner 10 and the electronic paper 20. More specifically, when the content is requested for viewing, the display limitation section 530 does not impose limitations on the display of the content in cases where the directly-connected state is employed between the scanner 10 and the electronic paper 20; however, the display limitation section 530 requires authentication and imposes a time limit with regard to the display of the content in cases where the state of connection is other than the directly-connected state.

The display section 535 displays the content selected by the selection section 520 in the display area of the electronic paper 20 under display limitations by the display limitation section 530.

The time-limit monitoring section 540, for each piece of content stored in the content storage section 515, calculates elapsed time from the reference point in time, compares the calculated elapsed time of each piece of content with the time limit therefor, identifies the pieces of content that have exceeded the time limit from the reference point in time, and informs the deletion section 525 and the display limitation section 530 of the pieces of content thus identified.

The authentication section 545, when authentication is required from the display limitation section 530, carries out an authentication process by making use of the authentication information that has been entered by the user (viewer) and the authentication information that has been set by the authentication setting section 505, and then informs the display limitation section 530 of the authentication result.

Next, operations in the information distribution system 1 are described. First, operations during the process of distributing content are described.

Figure 4:
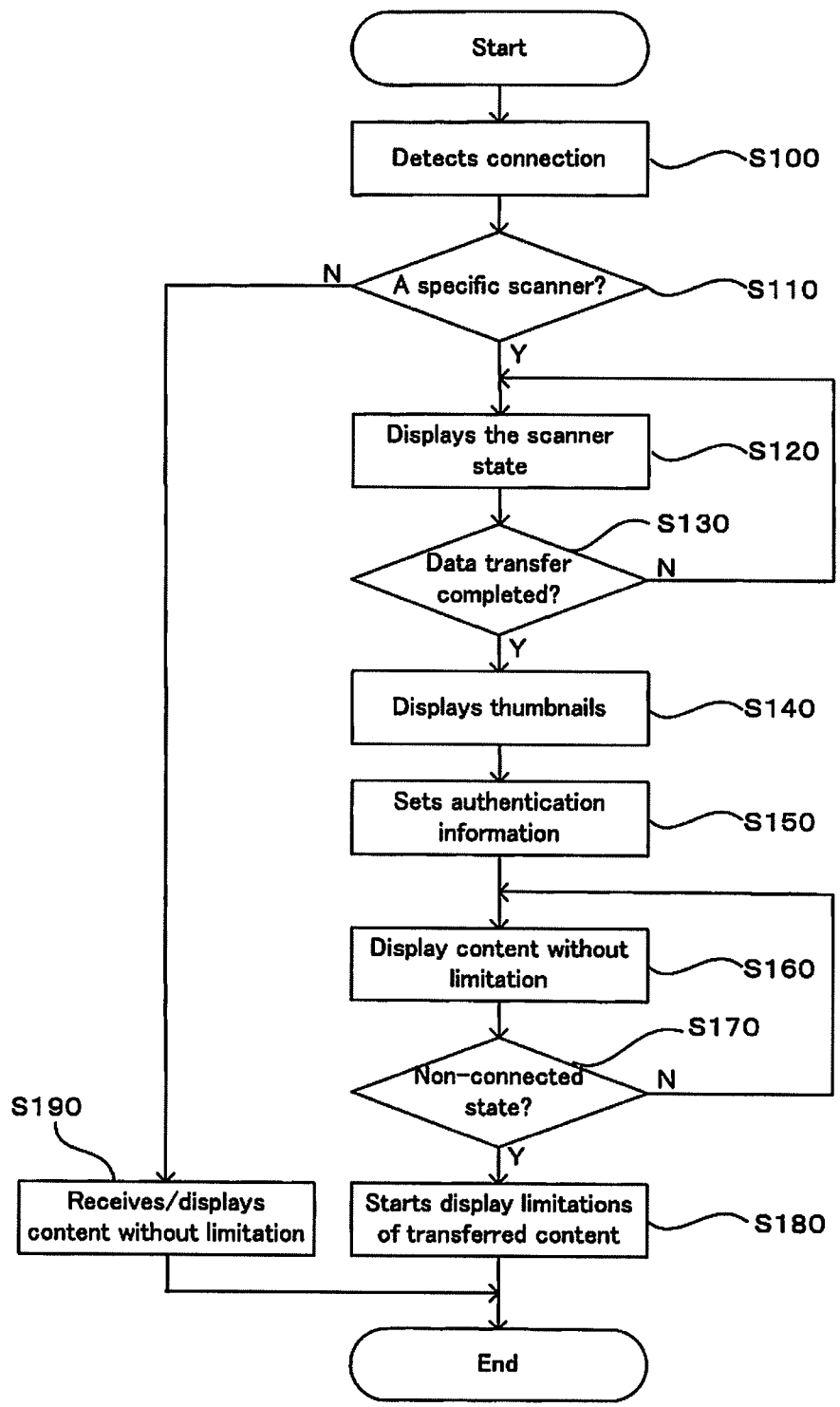
FIG. 4 is a flowchart showing the operations of the electronic paper 20 (S10) during content distribution.

FIG. 4 is a flowchart showing the operations of the electronic paper 20 (S10) during the process of distributing content.

As shown in FIG. 4, when the distributor of the content directly or indirectly connects the scanner 10 with the electronic paper 20 in step 100 (S100), the electronic paper 20 detects the connection with the scanner 10 and then starts up the information output program 5 (FIG. 2).

Specifically, in the case of a directly-connected state (FIG. 1(A)), the scanner 10 serving as the host, upon detection of a USB connection to the electronic paper 20, sends its apparatus ID to the electronic paper 20.

In step 110, the connection state judgment section 510 of the information output program 5 judges that the state of connection is a directly-connected state if it has received the apparatus ID of the scanner 10, and it judges that the state of connection is an indirectly-connected state if it does not receive the apparatus ID of the scanner 10; the result of judgment is output to the authentication setting section 505 and the display limitation section 530.

The information output program 5 proceeds to the processing of S120 if a directly-connected state is identified, and proceeds to the processing of S190 if an indirectly-connected state is identified.

In step 120 (S120), the display limitations section 530, upon receiving input of a judgment result indicating a directly-connected state from the connection state judgment section 510, allows the information acquisition section 500 to acquire the information that indicates the state of the scanner 10, and then allows the display section 535 to display an operation screen of the scanner 10 based on the state information obtained by the information acquisition section 500.

In this manner, the electronic paper 20 of this embodiment, which is in a directly-connected state and is not requested to display content, functions as an operation screen (user interface) of the scanner 10 that is connected directly, by performing such functions as receiving information on the processing status at the scanner 10 and accepting the processing discontinuation operation.

When a distributor operates the scanner 10 to cause it to start reading manuscript copies, the scanner 10 starts reading images on the manuscript copies.

In step 130 (S130), the information acquisition section 500 sequentially receives the image data read by the scanner 10 as the content, and outputs the received content to the content storage section 515.

The information output program 5 proceeds to the processing of S140 when the image data of all manuscript copies is transferred to the electronic paper 20, and returns to the processing of S120 if there exist untransferred image data.

In step 140 (S140), the display section 535 displays thumbnails of the content transferred from the scanner 10.

Users can check the images read by the scanner 10 by viewing the thumbnails.

In step 150 (S150), the authentication setting section 505 displays a message that prompts the user to set a password for the content transferred from the scanner 10 on the display section 535.

The user (viewer) carries out multiple page turning operations on the electronic paper 20.

The authentication setting section 505 sets a sequential combination of page turning operations by the user as a password of the content transferred from the scanner 10.

In step 160 (S160), the selection section 520 reads out the content designated by the user (viewer) from among the content stored in the content storage section 515, and displays the read-out content on the display section 535. In this case, because of the directly-connected state, no display limitations are carried out by the display limitation section 530.

In step 170 (S170), the connection state judgment section 510 continues to monitor the state of connection, and if the directly-connected state has changed over to a non-connected state, it informs the authentication setting section 505 and the display limitation section 530 of the change.

The information output program 5 returns to the processing of S160 if the directly-connected state is maintained, and proceeds to the processing of S180 if the state of connection has changed to a non-connected state.

In step 180 (S180), the display limitation section 530 begins to impose limitations on the display of the content upon receiving information on the shift to the non-connected state from the connection state judgment section 510. In this embodiment, requests for authentication and limitations of display time serve as the limitations on the display of the content.

Furthermore, the authentication setting section 505 stops accepting authentication information if it receives information on the shift to the non-connected state from the connection state judgment section 510. In this manner, the authentication setting section 505 of this embodiment accepts password settings for the content only when the scanner 10 is directly connected. This causes the viewer to set a password in the presence of the distributor, providing the possibility of preventing viewers from omitting to set a password or from setting a password that can be easily guessed by analogy.

In step 190 (S190), the electronic paper 20 receives image data as the content from the scanner 10, and displays the content upon request of a viewer without imposing display limitations on the received content. That is to say, the content is estimated as mildly confidential when it is transferred through a connection between the scanner 10 and the electronic paper 20 which is not in a directly-connected state, and accordingly is exempted from the display limitations based on this estimation.

As aforementioned, in the information distribution system 1 of the present embodiment, display limitations are imposed on the content transferred in a directly-connected state, and authentication information setting and the like are carried out. Display limitations are not imposed on the content transferred in an indirectly-connected state.

Next, operations when viewing content after a non-connected state are described.

Figure 5:
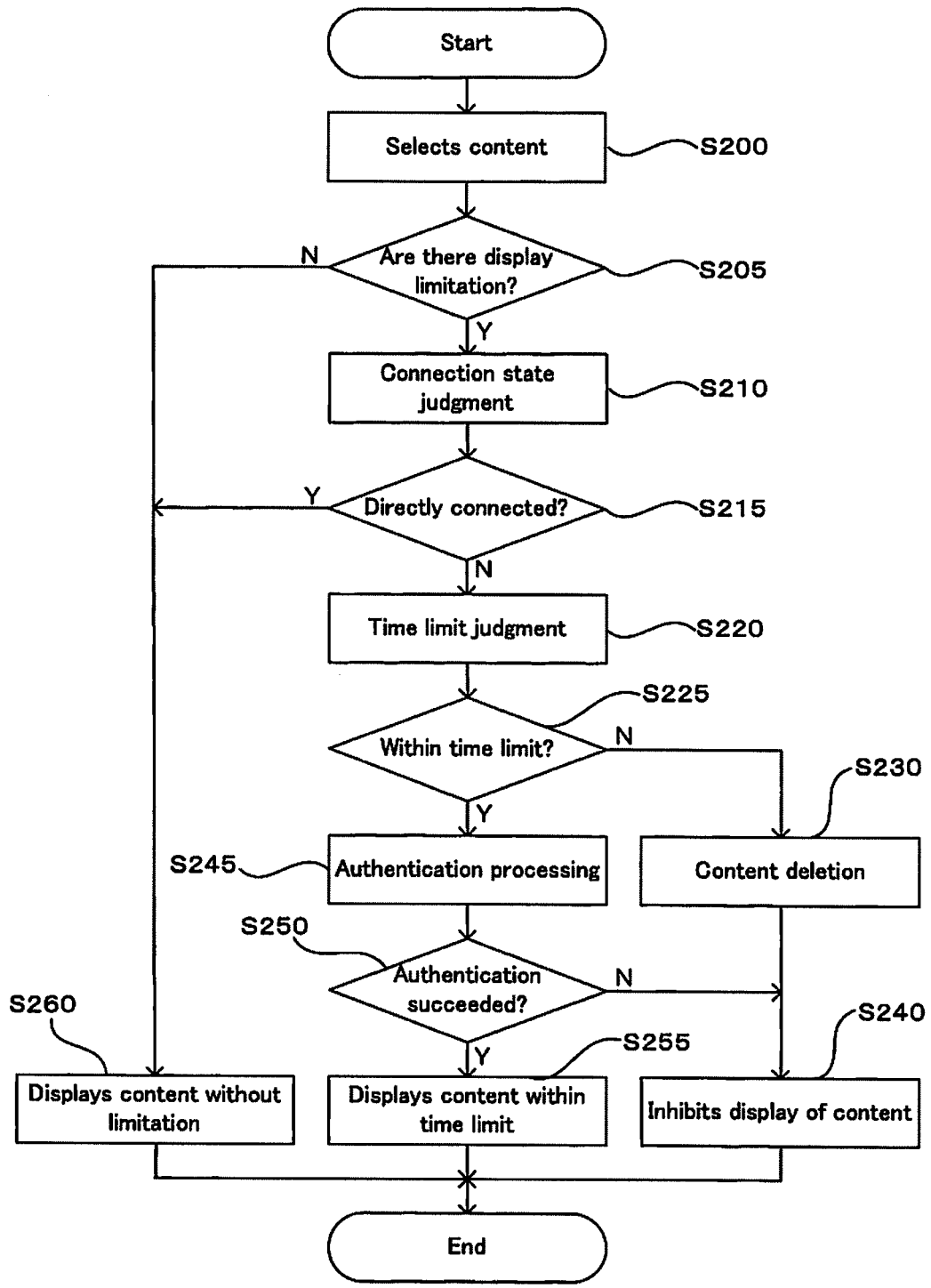
FIG. 5 is a flowchart showing the operations of the electronic paper 20 (S20) at the time of viewing the content.

FIG. 5 is a flowchart showing the operations of the electronic paper 20 (S20) when viewing content.

As shown in FIG. 5, in step 200 (S200), when a user (viewer) selects a desired piece of content (hereinafter referred to as 'requested content') by operating the electronic paper 20, the selection section 520 of the information output program 5 (FIG. 2) searches for the requested content by referring to the content database 600 (FIG. 3) of the content storage section 515, and reads out the identified content and the information associated with this piece of content (apparatus ID, reference point in time, time limit and authentication information). The content and information (apparatus ID, etc.) thus read out are output to the display limitation section 530.

In step 205 (S205), the display limitation section 530 judges whether or not display limitations are imposed on the content based on the information associated with the content.

The information output program 5 proceeds to the processing of S210 if it is judged that display limitations are imposed on the content, and proceeds to the processing of S260 if it is judged that display limitations are not imposed on the content.

In step 210 (S210), the connection state judgment section 510 starts monitoring the state of connection upon request of the display limitation section 530. A "directly-connected state when viewing the content" in this case is defined a directly-connected state with a combination of the scanner 10 and the electronic paper 20 at the time of distribution of the requested content. Therefore, the connection state judgment section 510 of this embodiment judges that the state of connection is direct when the apparatus ID associated with the requested content in the content database 600 (the ID of the scanner at the time of distribution) is identical to the apparatus ID received from the scanner 10 (the ID of the scanner connected at the time of viewing). On the other hand, the connection state judgment section 510 judges that the state of connection is not direct when the apparatus ID of the scanner at the time of distribution is not identical to the apparatus ID of the scanner at the time of viewing even if the scanner 10 is directly connected with the electronic paper 20.

In step 215 (S215), the connection state judgment section 510 outputs the result of judgment to the display limitation section 530.

The information output program 5 proceeds to the processing of S260 if a directly-connected state is identified, and proceeds to the processing of S220 if no directly-connected state is identified.

In step 220 (S220), the display limitation section 530 requests the judgment result on the time limit from the time-limit monitoring section 540 upon receiving information from the connection state judgment section 510 that the state of connection is not direct.

The time-limit monitoring section 540 periodically judges whether or not each piece of content is within the time limit based on the reference point in time and the time limit associated with each piece of content in the content database 600 and the current date and time, and returns the most recent judgment results to the display limitation section 530 upon request of the display limitation section 530 for the judgment results.

In step 225 (S225), the information output program 5 proceeds to the processing of S245 if it is judged that the requested content is within the time limit, and proceeds to the processing of S230 if it is judged that the requested content is not within the time-limit.

In step 230 (S230), the deletion section 525 deletes the requested content from the content storage section 515. It is also possible that the deletion section 525 periodically obtains judgment results from the time-limit monitoring section 540, and sequentially deletes the pieces of content that have exceeded their time limits.

In step 240 (S240), the display limitation section 530 inhibits the display of the requested content if the time-limit monitoring section 540 has judged that the content is not within the time limit. Furthermore, the display limitation section 530 displays a message in the display section 535 to the effect that the requested content cannot be displayed.

In step 245 (S245), the display limitation section 530 requests the authentication section 545 to carry out an authentication process for the user upon receiving the judgment result that the content is within the time limit from the time-limit monitoring section 540.

The authentication section 545 displays a message that prompts the user to enter a password on the display section 535, and accepts password entering operations by the user. In this case, the user (viewer) enters the password by carrying out page turning operations.

In step 250 (S250), the authentication section 545 compares the password entered by the user (a combination of page turning operations) with the authentication information associated with the requested content (a combination of page turning operations carried out at the time of content distribution). It judges that the authentication has been successful if the password matches, and that the authentication has failed if the password does not match.

The information output program 5 proceeds to the processing of S255 if it is judged that the authentication has been successful, and proceeds to the processing of S240 if it is judged that the authentication has failed.

In step 255 (S255), the display limitation section 530 allows the display section 535 to display the requested content when the authentication section 545 has judged that the authentication has been successful. In this case, the display limitation section 530 periodically requests the time-limit monitoring section 540 to provide judgment results regarding the time limit while the requested content is displayed, and permits the requested content to be displayed until it is judged that the time-limit has been exceeded.

In step 260 (S260), the display limitation section 530 allows the display section 535 to display the requested content without imposing limitations with regard to authentication and display time.

As aforementioned, in the information distribution system 1 of the present embodiment, display limitations at the time of viewing the content differ depending on the state of connection. More specifically, the electronic paper 20, when directly connected with the same scanner 10 as that at the time of content distribution, displays the requested content without imposing limitations with regard to authentication and display time, and otherwise imposes limitations on display time of the requested content as well as requesting authentication.

FIRST MODIFIED EXAMPLE

Next, a first modified example of the aforementioned embodiment is described.

Figure 6:
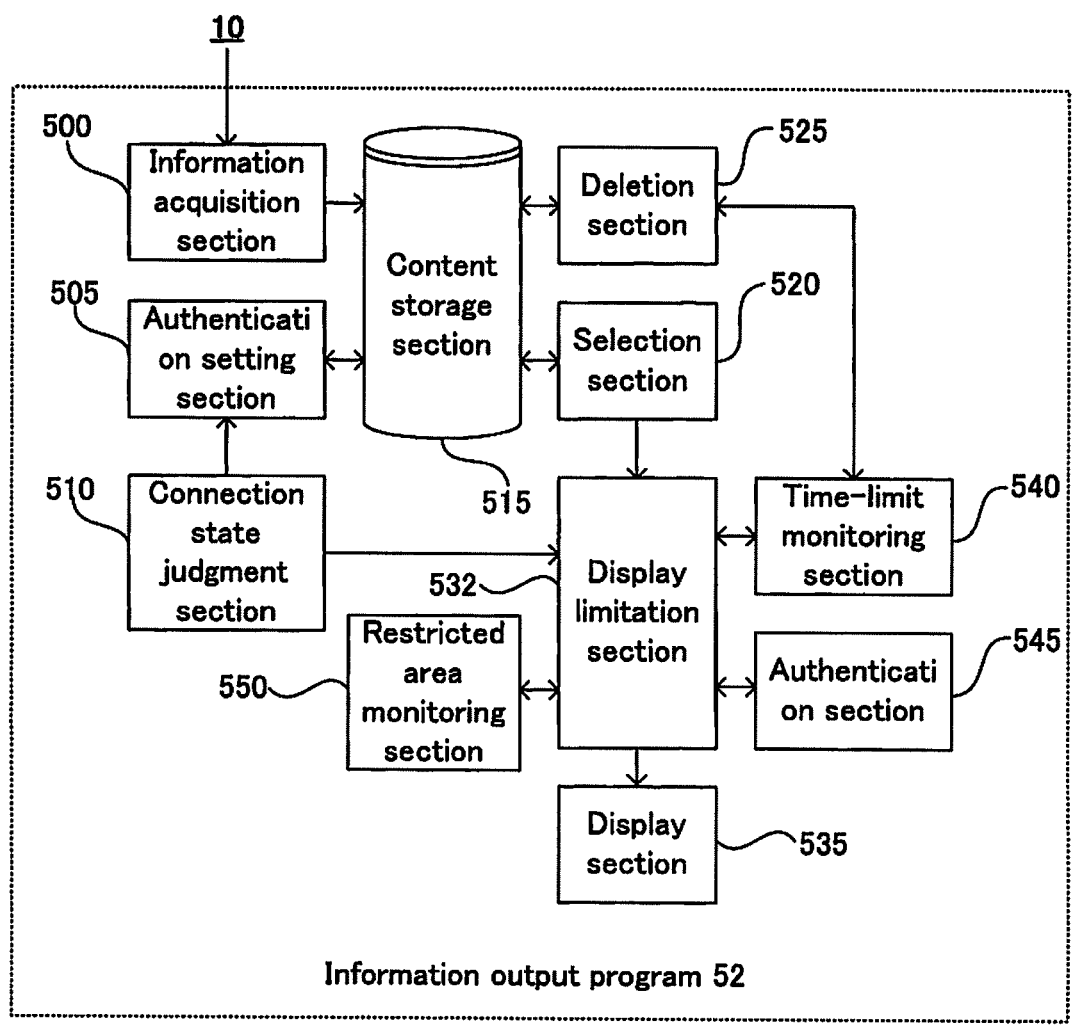
FIG. 6 is a block diagram showing a functional configuration of an information output program 52 in the first modified example.

FIG. 6 is a block diagram showing a functional configuration of the information output program 52 in the modified example. For the sections constituting the configuration in this diagram, the same corresponding numbers are used for practically the same sections as those in the configuration shown in FIG. 2.

As shown in FIG. 6, the information output program 52 of this modified example has a configuration wherein a restricted area monitoring section 550 is added to the information output program 5 in FIG. 2 and a first display limitation section 530 is replaced with a second display limitation section 532.

In the information output program 52, the restricted area monitoring section 550 monitors whether or not the electronic paper 20 exists in a restricted area which has been set in reference to the position where the scanner 10 is placed. The restricted area may be defined as a distance from the scanner 10, as a compartment on a map with the position of the scanner 10 as a reference, or as a range in which radio signals from the scanner 10 can reach.

The restricted area monitoring section 550 of this example monitors whether or not the electronic paper 20 exists in a predetermined compartment (same building, same administrative district, etc.) based on the GPS information of the electronic paper 20 at the time of content distribution (that is, position information approximating to the GPS information of the scanner 10 at the time of content distribution), the GPS information of the electronic paper 20 at the time of viewing the content, and map information.

FIG. 7 is a diagram illustrating a content database 602 of this modified example.

As shown in FIG. 7, in the content database 602 of this modified example, fields for reference positions and restricted areas are added to the content database 600 in FIG. 3. The reference position is the position information (GPS information) of the scanner 10 at the time of content distribution. The restricted area represents the information that defines an area in which the content can be viewed with the reference position as the reference. For example, when the restricted area is "in the same building", it is permitted to view the content as long as the electronic paper 20 is located in the same building as the reference position. When the restricted area is "in the same administrative district", it is permitted to view the content as long as the electronic paper 20 is located in the same administrative district as the reference position.

Incidentally, in this modified example, the reference position is registered in the content database 602 since the reference position is determined at the time of content distribution; however, for example, when the restricted area is defined as "an area in which wireless communication directly with the scanner 10 is possible" or the like, it is not necessary to register the reference position and the restricted area in the content database 602 because the position of the scanner 10 at the time of viewing serves as the reference position and whether or not the electronic paper 20 is located within the restricted area is judged depending on the availability of wireless communication.

The display limitation section 532 of this modified example imposes limitations on areas based on the results of monitoring by the restricted area monitoring section 550 in addition to the authentication and limitations on display time when the state of connection between the scanner 10 and the electronic paper 20 is not a directly-connected state.

Figure 8:
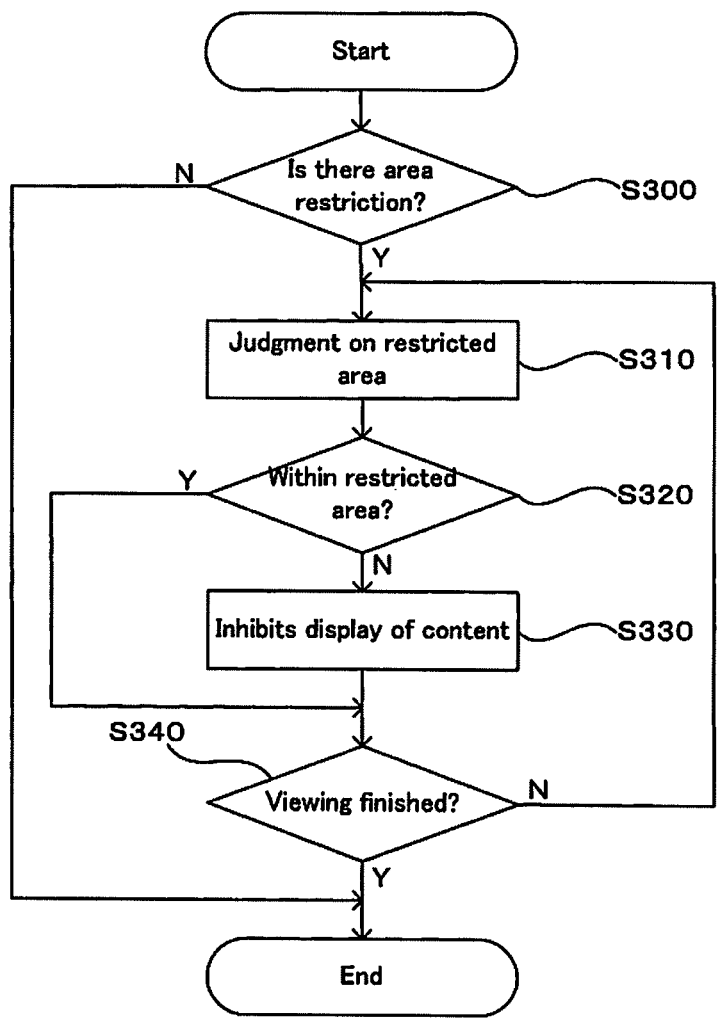
FIG. 8 is a flowchart showing an area restriction operation (S30) at the time of viewing the content.

FIG. 8 is a flowchart showing the area restriction operation (S30) at the time of viewing the content. The area restriction operation of this flowchart is carried out in parallel to the operations shown in the flowchart of FIG. 5.

As shown in FIG. 8, in step 300 (S300), when a user (viewer) selects a desired piece of content (requested content) by operating the electronic paper 20, the selection section 520 of the information output program 52 (FIG. 6) searches for the requested content by referring to the content database 602 (FIG. 7) of the content storage section 515, and reads out the identified content and the information associated with this piece of content (apparatus ID, reference point in time, time limit, reference position, restricted area and authentication information). The content and information (apparatus ID, etc.) thus read out are output to the display limitation section 532.

The information output program 52 proceeds to the processing of S310 if the reference position and the restricted area are associated with the requested content, and terminates the area restriction operation (S30) if the reference position or the restricted area is not associated with the requested content. In this example, the restricted area is defined so that the electronic paper 20 in a directly-connected state is always deemed to be located within the restricted area, and, therefore, being in a state other than the directly-connected state does not constitute an initiation condition of area restriction; however, in a configuration where the information display apparatus even in a directly-connected state can be out of the restricted area, it is preferable that the initiation conditions of area restriction include a state where the information display apparatus is not in a directly-connected state.

In step 310 (S310), the display limitation section 532 periodically requests the restricted area monitoring section 550 to provide the judgment result on the restricted area.

The restricted area monitoring section 550 compares the current position (GPS information of the electronic paper 20) with the reference position and restricted area associated with the requested content in the content database 602 in response to a request from the display limitation section 532, judges whether or not the current position of the electronic paper 20 is within the restricted area, and returns the judgment result to the display limitation section 532.

In step 320 (S320), the information output program 52 proceeds to the processing of S340 if the current position of the electronic paper 20 is within the restricted area, and proceeds to the processing of S330 if the current position of the electronic paper 20 is out of the restricted area.

In this flowchart (S30), no particular display limitations are imposed if the current position of the electronic paper 20 is within the restricted area; therefore, requested content is displayed by the display section 535 unless it is inhibited in the process of the flowchart (S20) in FIG. 5.

In step 330 (S330), the display limitation section 532 inhibits the display of the requested content if the restricted area monitoring section 550 has judged that the current position of the electronic paper 20 is out of the restricted area.

Furthermore, the display limitation section 532 makes the display section 535 display a message that the requested content cannot be displayed because the electronic paper 20 is out of the permitted area (restricted area).

In step 340 (S340), the information output program 52 returns to the processing of S310 to intermittently repeat the processing from S310 to S330 until an instruction to stop displaying the requested content is given by the viewer, and terminates the area restriction operation (S30) when an instruction to stop displaying the content is given by the viewer.

As aforementioned, in the information distribution system 1 of the first modified example, limitations are imposed on areas to view the content if the state of connection between the scanner 10 and the electronic paper 20 is not a directly-connected state.

OTHER MODIFIED EXAMPLES

With regard to the aforementioned embodiment, a configuration using an electronic paper as the information display apparatus was illustrated as an example. However, the present invention is not restricted to this embodiment, and may make use of a cellular telephone or a Personal Digital Assistant (PDA) as the information display apparatus.

Furthermore, instead of the mode of the information reading apparatus (scanner) in the aforementioned embodiment, which optically reads out images and distributes them to the information display apparatus, the information reading apparatus may read out data files from information recording media (information media) such as DVD-Rs and distribute the data files thus read to the information display apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. An information distribution system comprising:
   an information reading apparatus reading out data distributed from an information medium; and
   an information display apparatus having an information acquisition unit for acquiring the data distributed from said information reading apparatus, a display for displaying the data acquired by said information acquisition unit, an authentication setting unit that accepts password settings for the data only when said information reading apparatus is in a directly-connected state with said information display apparatus using a connection cable and stops accepting password settings when said information reading apparatus is not in a directly-connected state with said information display apparatus using a connection cable, and a display limitation unit for imposing severer display limitations in cases where said information reading apparatus in an indirectly-connected state with said information display apparatus using connection cables between the information reading apparatus, an intermediary device, and the information display apparatus than in cases where said information reading apparatus is in a directly-connected state with said information display apparatus using a connection cable, wherein the display limitation unit requires password authentication with regard to the display of the data in cases where said information reading apparatus is not in a directly-connected state with said information display apparatus using a connection cable.

2. The information distribution system as set forth in claim 1, wherein said display limitation unit imposes severer display limitations in cases where said information reading apparatus is in a non-connected state with the information display apparatus than in cases where said information reading apparatus is in a directly-connected state with the information display apparatus.

3. The information distribution system as set forth in claim 2, wherein said information reading apparatus optically reads out image data from an image display medium, said information acquisition unit acquires image data from said information reading apparatus, said display limitation unit permits this image data to be displayed by said display only for a period from a reference point in time set for each piece of image data acquired by said information acquisition unit until a predetermined time limit is elapsed when said information reading apparatus is in a non-connected state with the relevant information display apparatus, and said information display apparatus further has a deletion unit for deleting this image data from a memory area of the relevant information display apparatus when the predetermined time limit is elapsed from the reference point in time set for each piece of image data acquired by said information acquisition unit.

4. The information distribution system as set forth in claim 2, wherein said information reading apparatus optically reads out image data from an image display medium, said information acquisition unit acquires image data from said information reading apparatus, and said display limitation unit permits this image data to be displayed by said display only when there exists the relevant information display apparatus within a restricted area set with the position of said information reading apparatus as a reference in cases where said information reading apparatus is in a non-connected state with the relevant information display apparatus.

5. An information display apparatus comprising:
   an information acquisition unit for acquiring the data distributed from external devices;
   a display for displaying the data acquired by said information acquisition unit;
   an authentication setting unit that accepts password settings for the data only when said external device is in a directly-connected state with said information display apparatus using a connection cable and stops accepting password settings when said external device is not in a directly-connected state with said information display apparatus using a connection cable; and
   a display limitation unit for imposing severer display limitations in cases where said external device is in an indirectly-connected state with said information display apparatus using connection cables between the external device, an intermediary device, and the information display apparatus than in cases where said external device is in a directly-connected state with information display apparatus using a connection cable, wherein the display limitation unit requires password authentication with regard to the display of the data in cases where said external device is not in a directly-connected state with said information display apparatus using a connection cable.

6. An information management method for managing data distributed from an information reading apparatus to an information display apparatus, comprising:
   a step that the information reading apparatus reads out the data distributed from the information medium;
   a step that the information display apparatus acquires the data distributed from said information reading apparatus;
   a step that an authentication setting unit accepts password settings for the data only when said information reading apparatus is in a directly-connected state with said information display apparatus using a connection cable and stops accepting password settings when said information reading apparatus is not in a directly-connected state with said information display apparatus using a connection cable; and
   a step that the information display apparatus imposes severer display limitations in cases where said information reading apparatus is in an indirectly-connected state with said information display apparatus using connection cables between the information reading apparatus, an intermediary device, and the information display apparatus than in cases where said information reading apparatus is in a directly-connected state with said information display apparatus using a connection cable, wherein password authentication is required with regard to the display of the data in cases where said information reading apparatus is not in a directly-connected state with said information display apparatus using a connection cable.

7. A non-transitory computer readable medium storing a program causing a computer to execute a process comprising:
   accepting password settings for data acquired from an external device only when said external device is in a directly-connected state with said computer using a connection cable and stopping accepting password settings when said external device is not in a directly-connected state with said computer using a connection cable;
   imposing display limitations on the data acquired from the external device according to the state of physical connection between said external device and said computer;
   wherein the display limitations are severer in cases where said external device is in an indirectly-connected state with said computer using connection cables between the external device, an intermediary device, and the computer than in cases where said external device is in a directly-connected state with said computer using a cable; and requiring password authentication with regard to the display of the data in cases where said external device is not in a directly-connected state with said computer using a connection cable.

8. The information distribution system according to claim 1, wherein the authentication setting unit accepts a sequential combination of page turning operations as a password for the data.

9. The information display apparatus according to claim 5, wherein the authentication setting unit accepts a sequential combination of page turning operations as a password for the data.

10. The information management method according to claim 6, wherein the authentication setting unit accepts a sequential combination of page turning operations as a password for the data.

11. The non-transitory computer readable medium storing a program according to claim 7, wherein password settings are a sequential combination of page turning operations.

* * * * *